(12) United States Patent
Garman et al.

(10) Patent No.: US 7,281,901 B2
(45) Date of Patent: Oct. 16, 2007

(54) FREE-FORM WELDED POWER SYSTEM COMPONENT

(75) Inventors: Brian Garman, Groveland, IL (US); Steve O'Hara, Zionsville, IN (US)

(73) Assignee: Caterpillar Inc., Peoria, IL (US)

( * ) Notice: Subject to any disclaimer, the term of this patent is extended or adjusted under 35 U.S.C. 154(b) by 175 days.

(21) Appl. No.: 11/024,313

(22) Filed: Dec. 29, 2004

(65) Prior Publication Data

US 2006/0140767 A1 Jun. 29, 2006

(51) Int. Cl.
*F03D 11/02* (2006.01)
(52) U.S. Cl. .................................. 416/233; 416/213 R
(58) Field of Classification Search ................ 416/232, 416/233, 223 R, 234, 236, 223 B, 182, 213 R
See application file for complete search history.

(56) References Cited

U.S. PATENT DOCUMENTS

| | | | |
|---|---|---|---|
| 1,150,278 | A | 8/1915 | Lepley |
| 4,621,762 | A | 11/1986 | Bronowski |
| 4,624,406 | A | 11/1986 | Yasuda et al. |
| 5,429,877 | A | 7/1995 | Eylon |
| 5,433,002 | A | 7/1995 | Nadolink |
| 5,701,669 | A | 12/1997 | Meier |
| RE35,756 | E | 3/1998 | Schneebeli et al. |
| 5,797,182 | A | 8/1998 | Furlan et al. |
| 6,004,097 | A | 12/1999 | Wark et al. |
| 6,144,008 | A | 11/2000 | Rabinovich |
| 6,155,783 | A | 12/2000 | Beyer |
| 6,274,839 | B1 | 8/2001 | Stone et al. |
| 6,305,169 | B1 * | 10/2001 | Mallof ........................ 60/608 |
| RE37,562 | E | 2/2002 | Clark et al. |
| 6,364,616 | B1 | 4/2002 | Stevenson et al. |
| 6,454,533 | B2 | 9/2002 | Beyer |
| 6,687,994 | B2 | 2/2004 | Endres |

(Continued)

FOREIGN PATENT DOCUMENTS

EP 0350000 1/1990

(Continued)

OTHER PUBLICATIONS

Bonsor, *How Hydropower Plants Work*, printed from www.howstuffworks.com on Nov. 22, 2004.

*Primary Examiner*—Edward K. Look
*Assistant Examiner*—Dwayne J White
(74) *Attorney, Agent, or Firm*—Finnegan, Henderson, Farabow, Garrett & Dunner

(57) ABSTRACT

The present disclosure is directed to a power system component for a work machine. The power system component may include a wheel having one or more free-form welded members. The wheel may include a front end, a back end, and a central, axial spine member extending from the front end to the back end. The wheel may also include an outer shell adjacent the spine member at the front end, extending toward the back end, and flaring radially away from the spine member near the back end. The outer shell may include a front surface, a back surface, and one or more protrusions extending from the front surface. The wheel may further include at least one void defined between the spine member and the back surface of the outer shell and at least one reinforcing structure connecting the outer shell with a portion of the spine member between the front end and the back end.

19 Claims, 4 Drawing Sheets

U.S. PATENT DOCUMENTS 6,705,383 B2    3/2004    Beeck et al.

FOREIGN PATENT DOCUMENTS

| | | |
|---|---|---|
| EP | 0836899 | 4/1998 |
| EP | 0863221 | 9/1998 |
| GB | 2058941 A * | 4/1981 |
| JP | 56036391 | 4/1981 |
| JP | 61234205 | 10/1986 |
| JP | 06272506 | 9/1994 |

* cited by examiner

FREE-FORM WELDED POWER SYSTEM COMPONENT

TECHNICAL FIELD

The present disclosure is directed to a power system component and, more particularly, to a free-form welded power system component.

BACKGROUND

The performance of internal combustion engines may be enhanced with forced induction, such as, for example, supercharging or turbocharging. Forced induction devices, such as superchargers or turbochargers, are essentially air compressors that force more air into the combustion chambers of an engine than the engine could otherwise draw in on its own. With this increased air, more fuel may be injected to create a balanced, but more potent air-fuel mixture. This air-fuel mixture may combust more forcefully, thus enabling the engine to produce more power.

Forced induction devices may include turbine wheels and/or compressor wheels that spin to compress intake air, and thus, increased air flow to the engine. These wheels, however, have mass, and therefore, inertia. The ability to overcome this inertia and get these wheels spinning ("spool up") can be a substantial factor in the responsiveness of the engine. That is, the faster the forced induction device can accelerate these wheels, the more responsive the engine may be. In addition, faster acceleration of these wheels enables transient emissions (i.e., emissions created by other than steady state engine operation, such as acceleration or constant rpm with increasing load) to be better controlled with less sacrifice of engine performance. The air-fuel ratio may be maintained while rapidly increasing fuel supplied to the combustion chamber if the forced induction device can spool up quickly to match the increased fuel with increased air. The ability to maintain a desired air-fuel ratio allows for better emissions control. It may be desirable, therefore, to reduce the mass of these wheels in order to reduce their inertia and allow for faster spool up.

Forced induction systems have been developed that use more than one forced induction device (e.g., twin-turbos). By using two smaller turbos, instead of one large one, the twin-turbos may spool up faster because the two smaller compressor wheels may be less massive than the single large one. These types of systems, however, could still benefit from lighter components. Further, a system with multiple forced induction devices may be more costly and/or complex to produce and maintain.

Wheels for certain types of devices have been developed with hollow inner geometry in order to reduce mass and/or allow for passage of fluid through them. For example, U.S. Pat. No. 6,454,533, issued on Sep. 24, 2002, to Beyer ("the '533 patent"), discloses a hollow wheel for a hydraulic turbine. The wheel of the '533 patent, however, is designed for a hydraulic turbine that spins at about 90 rpm. In contrast, forced induction devices can spin at speeds up to 200,000 rpm. These high rotational speeds call for utmost precision in the manufacturing process to insure the structural integrity of the component under such high demands. Some manufacturing techniques, such as casting, have limitations with regard to the precision and/or kinds of structures that they are capable of producing. Innovative casting techniques have been developed, but may be complicated and/or cumbersome.

The disclosed power system component is directed toward overcoming one or more of the problems set forth above.

SUMMARY OF THE INVENTION

In one aspect, the present disclosure is directed to a power system component for a work machine. The power system component may include a wheel having one or more free-form welded members. The wheel may include a front end, a back end, and a central, axial spine member extending from the front end to the back end. The wheel may also include an outer shell adjacent the spine member at the front end, extending toward the back end, and flaring radially away from the spine member near the back end. The outer shell may include a front surface and a back surface, and further include one or more protrusions extending from the front surface. The wheel may further include at least one void defined between the spine member and the back surface of the outer shell and at least one reinforcing structure connecting the outer shell with a portion of the spine member between the front end and the back end.

In another aspect, the present disclosure is directed to a method of manufacturing a power system wheel for a work machine. The method may include melding metal powder in a controlled pattern to form a first layer of the wheel. The method may also include melding one or more additional layers of the metal powder in a controlled pattern, each layer building upon the previous layer to form a central, axial spine member extending from a first end to a second end. Further, the method may also include continuing to meld additional layers to form an outer shell adjacent the spine member at the first end of the wheel, extending toward the second end, and flaring radially away from the spine member near the second end. The outer shell may include a first surface and a second surface, one or more protrusions extending from the first surface, and at least one void defined between the spine member and the second surface of the outer shell.

In another aspect, the present disclosure is directed to a work machine including a frame, an engine mounted on the frame, and a power system component associated with the engine. The power system component may include a wheel having one or more free-form welded members. The wheel may include a front end, a back end, and a central axial spine member extending from the front end to the back end. The wheel may also include an outer shell extending from the front end toward the back end and flaring away from the spine member near the back end. The outer shell may include a front surface and a back surface, and the wheel may include one or more protrusions extending from the front surface. The wheel may further include at least one void defined between the spine member and the back surface of the outer shell. In addition, the wheel may include at least one reinforcing structure connecting the outer shell with a portion of the spine member between the front end and the back end.

DETAILED DESCRIPTION

Reference will now be made in detail to the drawings. Wherever possible, the same reference numbers will be used throughout the drawings to refer to the same or like parts.

In one embodiment, one or more parts of a power system component for a work machine (e.g., a compressor wheel or turbine wheel for a forced induction device) may be manufactured by free-form welding. Free-form welding may include assembling a component layer by layer by melding metal powder (e.g., joining at least some of the powder particles together through melting, sintering, fusing, or any other suitable bonding mechanism) in a computer controlled pattern to form each layer. The metal powder may be melded together by any suitable technique, such as, for example, laser sintering, electron beam welding, or any other controlled welding method. In certain embodiments, the entire component may be formed using free-form welding. In other embodiments, only selected portions of the component may be free-form welded, and other portions may be formed by other techniques and attached to the free-form welded portions in one or more separate steps.

Figure 1:
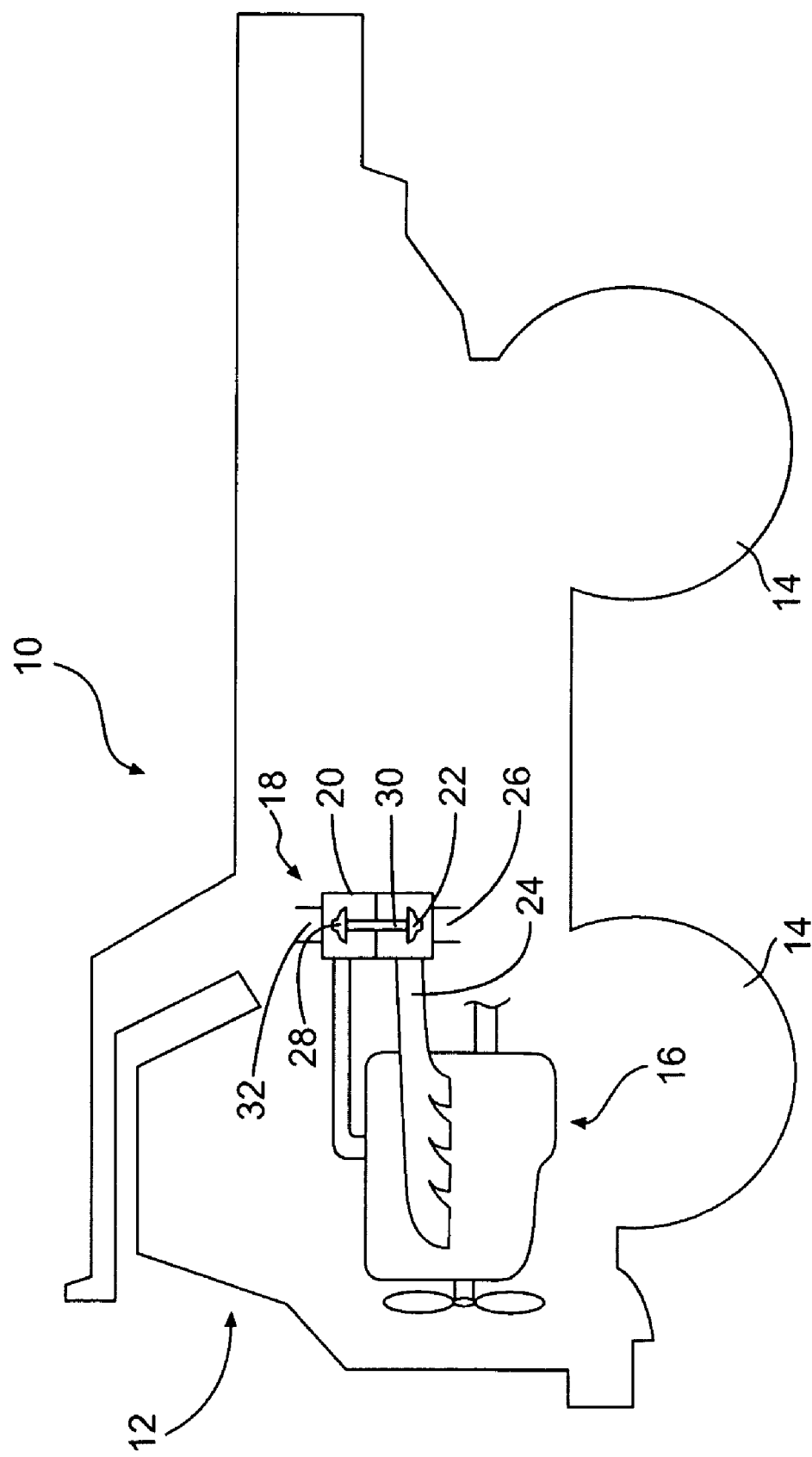
FIG. 1 is a diagrammatic illustration of a work machine having a forced induction power system according to an exemplary disclosed embodiment.

FIG. 1 illustrates a work machine 10. Work machine 10 may include an operator station 12. Work machine 10 may further include one or more traction devices 14, an engine 16 (e.g., an internal combustion engine), and a forced induction system 18.

Although work machine 10 is shown as a truck, work machine 10 could be any type of equipment having an engine. Accordingly, traction devices 14 may be any type of traction devices, such as, for example, wheels, as shown in FIG. 1, tracks, belts, or any combinations thereof.

Engine 16 may be any kind of internal combustion engine. For example, engine 16 may be a gasoline engine, a diesel engine, a natural gas engine, or any other engine that combusts an air-fuel mixture to generate power.

Forced induction system 18 may include a turbocharger 20, as shown in FIG. 1. Turbocharger 20 may include a turbine wheel 22 that is spun by exhaust gases flowing through an upstream exhaust conduit 24 before they proceed to a downstream exhaust conduit 26. Turbine wheel 22 may be connected to a compressor wheel 28 by a shaft 30. Compressor wheel 28 may be configured to draw in air from an air intake 32, compress it, and direct it into the combustion chambers of engine 16.

Alternatively, forced induction system 18 may include a supercharger (not shown), or any other type of compressor. A supercharger may compress intake air in a similar manner, but, rather than using exhaust flow to spin shaft 30, a supercharger may be driven by a separate electric motor or by the crankshaft of engine 16 (e.g., via a pulley system).

Figure 2:
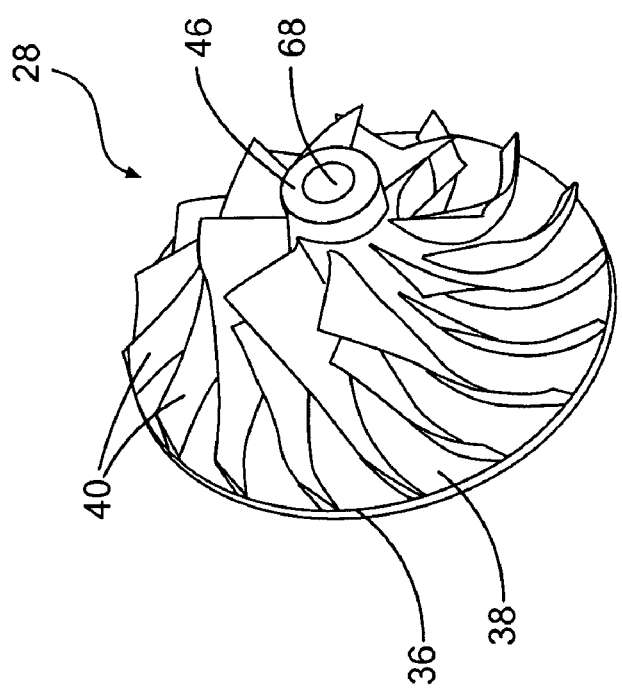
FIG. 2 is a diagrammatic illustration of the front side of a power system component according to an exemplary disclosed embodiment.

FIG. 2 illustrates a frontal view of compressor wheel 28. Compressor wheel 28 may include one or more free-form welded members. Compressor wheel 28 may include an outer shell 36 having a front surface 38 and a back surface 39 (see FIG. 3). Compressor wheel 28 may also include protrusions, such as one or more blades 40 protruding from front surface 38. Blades 40 may be configured to draw in air from in front of compressor wheel 28 and force it laterally (i.e., centrifugally) toward engine 16. In other embodiments (e.g., turbine wheels), blades 40 may be configured to be turned by air flowing laterally (i.e., centripetally) and redirect it in front of the wheel.

Figure 3:
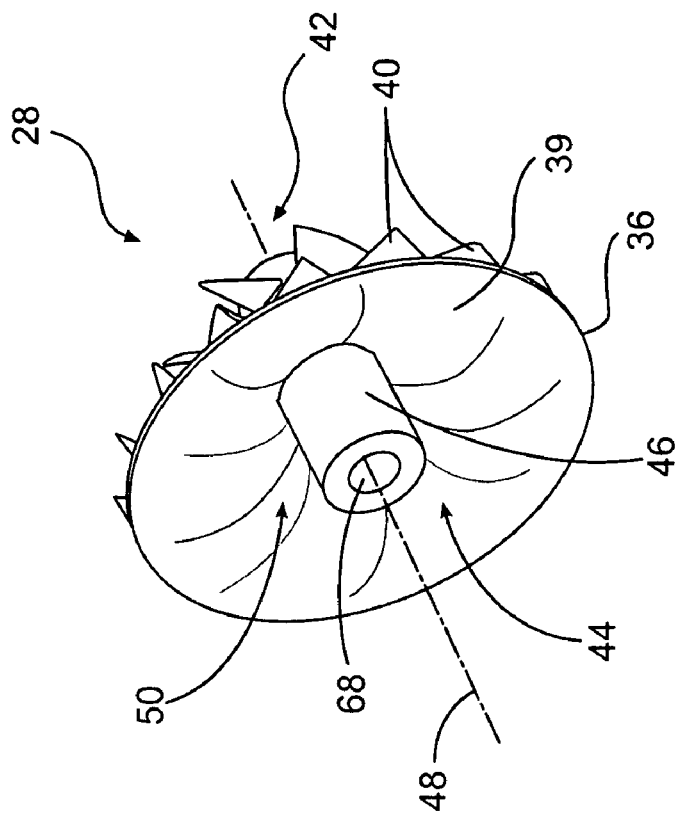
FIG. 3 is a diagrammatic illustration of the back side of a power system component according to an exemplary disclosed embodiment.

FIG. 3 illustrates a rear view of compressor wheel 28. Compressor wheel 28 may include a front end 42 and a back end 44. Compressor wheel 28 may also include a central, axial spine member 46 extending from front end 42 to back end 44 along a longitudinal axis 48. In addition, compressor wheel 28 may include outer shell 36 adjacent spine member 46 at front end 42. Outer shell 36 may extend toward back end 44 and flare radially away from spine member 46 near back end 44. Compressor wheel 28 may further include at least one void 50 between spine member 46 and back surface 39 of the outer shell.

Figure 4:
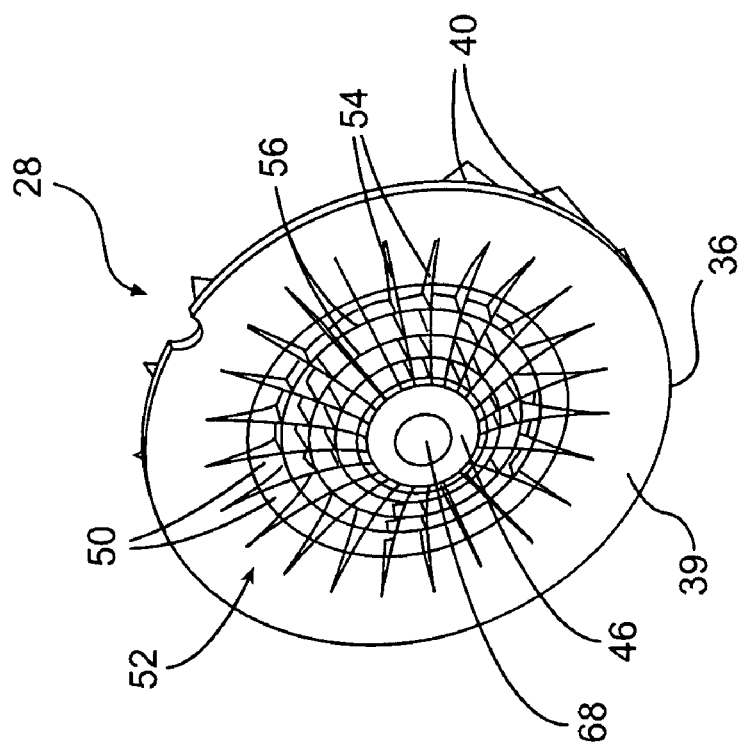
FIG. 4 is a diagrammatic illustration of the back side of a power system component having reinforcing structure according to an exemplary disclosed embodiment.

FIG. 4 illustrates a rear view of an embodiment of compressor wheel 28, which may include a reinforcing structure 52 connecting outer shell 36 with spine member 46 between front end 42 and back end 44. Reinforcing structure 52 may include a lattice or honeycomb structure. For example, reinforcing structure 52 may include axially aligned ribs 54 protruding radially from spine member 46 to outer shell 36. Alternatively, or additionally, reinforcing structure 52 may include axially aligned, concentric ribs 56 about spine member 46.

Figure 5:
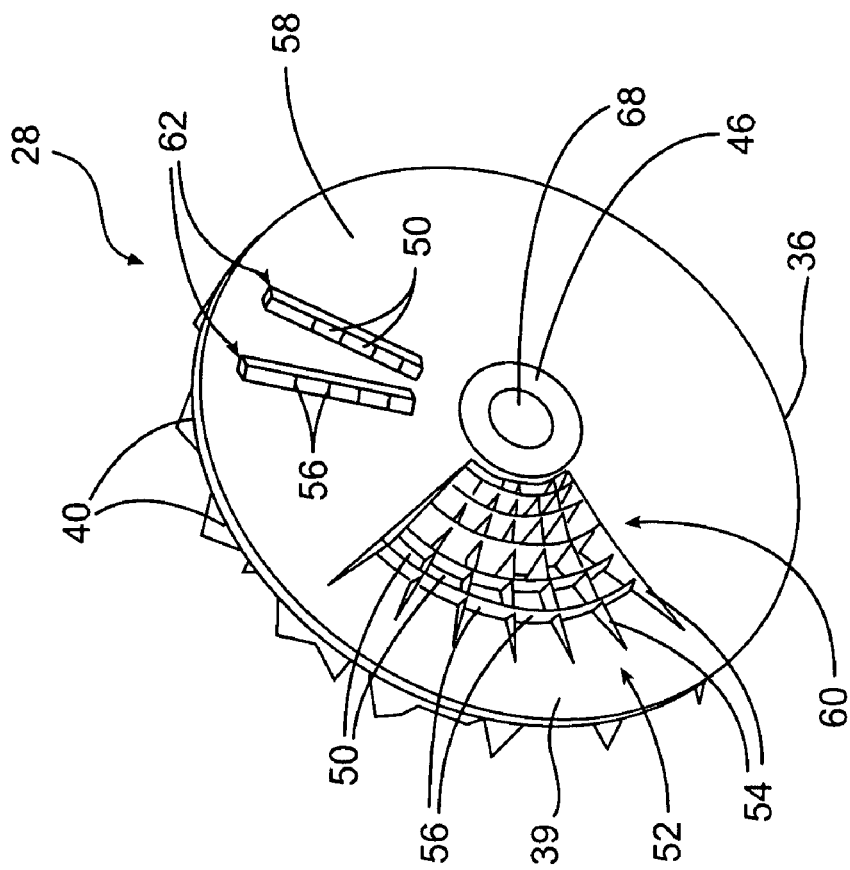
FIG. 5 is a diagrammatic illustration of the back side of a power system component having a backing plate according to an exemplary disclosed embodiment.

FIG. 5 illustrates a backing plate 58 connecting spine member 46 to outer shell 36 at back end 44. A cutaway portion 60 of FIG. 5 reveals reinforcing structure 52 beneath backing plate 58. Backing plate 58 may also connect to reinforcing structure 52 to provide additional structural support. Backing plate 58 may include one or more slots 62 corresponding with the voids to allow un-melded powder to be removed from voids 50. Alternatively, backing plate 58 may be welded in place separate from the free-form welding of the rest of compressor wheel 28. Any un-melded powder may be removed from the voids after the free-form welding is complete, but before backing plate 58 is put on.

Figure 6:
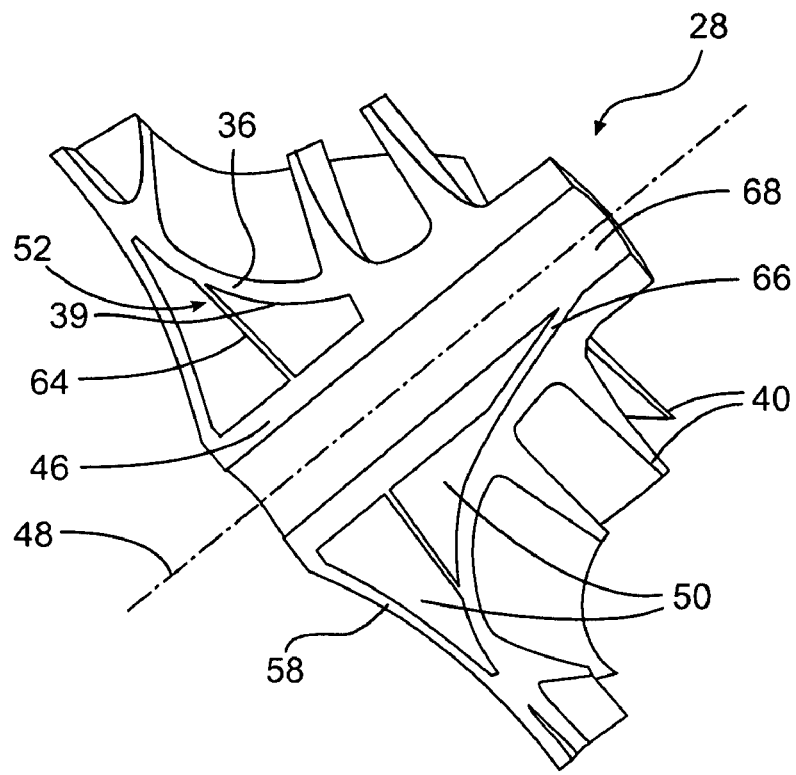
FIG. 6 is a partial diagrammatic view of a power system component having reinforcing structure according to an exemplary disclosed embodiment.

FIG. 6 illustrates an embodiment of compressor wheel 28 wherein reinforcing structure 52 includes at least one radially extending reinforcing disc 64. Backing plate 58 may be free-form welded without any slots. As an alternative to slots 62, compressor wheel 28 may be formed with at least one passage 66 connecting voids 50 to a central bore 68 to allow un-melded powder to be removed.

Figure 7:
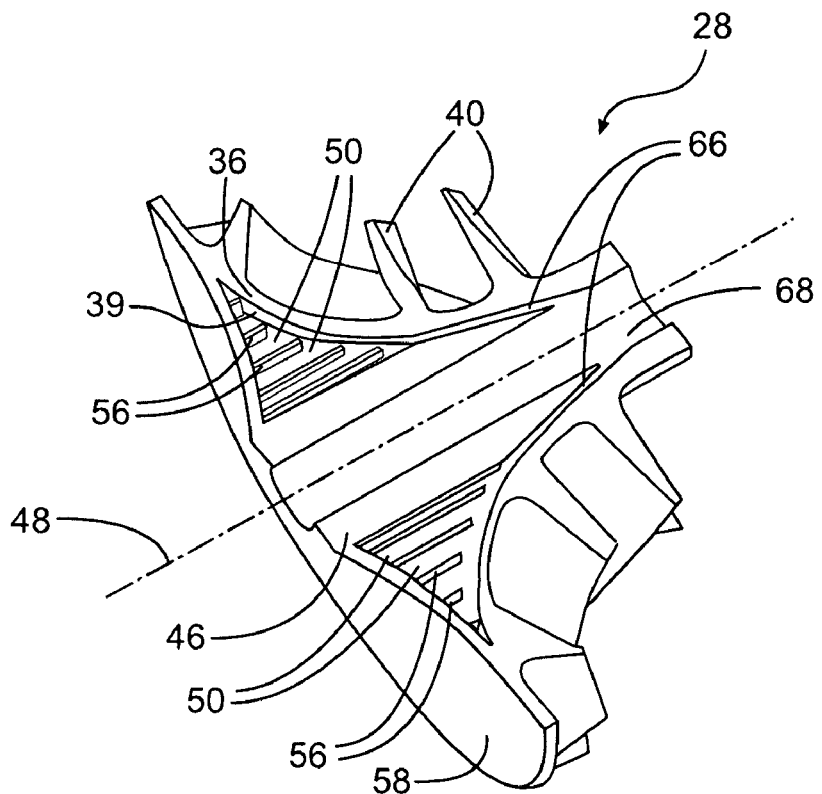
FIG. 7 is a partial diagrammatic view of another power system component having reinforcing structure according to an exemplary disclosed embodiment.

FIG. 7 illustrates an embodiment of compressor wheel 28 having reinforcing, concentric ribs 56 similar to that shown in FIG. 4, without radially extending ribs 54. Further, the embodiment illustrated in FIG. 7 may include backing plate 58. Compressor wheel 28 may also include more than one passage 66 connecting the voids to central bore 68 to allow un-melded powder to be removed. Passages 66 may be arranged in an array (e.g., incrementally spaced around compressor wheel 28.

INDUSTRIAL APPLICABILITY

The disclosed component may be used for any suitable application of an internal combustion engine. Such applications may include, for example, stationary equipment such as power generation sets or mobile equipment, such as vehicles. The disclosed system may be used for any kind of vehicle, such as, for example, automobiles, work machines (including those for on-road, as well as off-road use), and other heavy equipment.

The disclosed component may include a wheel as described above. In one embodiment, the component may include a compressor wheel for a forced induction device, such as a turbocharger or supercharger. Alternatively, the component may be a turbine wheel for a turbocharger.

Free-form welding may be used to manufacture the disclosed component in order to facilitate formation of hollow geometries including, in some embodiments, reinforcing structure. These hollow geometries may provide an effective way to reduce the mass of the component. While some embodiments may be cast, casting can involve many steps, such as, for example, forming a prototype or model and forming a mold from the prototype or model. Free-form welding skips the prototype and mold stages altogether. The component may be designed on a computer (i.e., computer aided design, a.k.a. "CAD"), then the CAD model may be used to control a welding machine via computer numerical control (CNC). Not only does skipping the prototype step save time, and potentially costs, but it may also help insure the precision of the manufactured part. By forming the part directly from CAD data, its dimensions may be formed with a high degree of accuracy, whereas some precision may be lost while developing a prototype and/or while making the mold from the prototype.

It will be apparent to those skilled in the art that various modifications and variations can be made to the disclosed free-form welded power system component without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A power system component for a machine, comprising:
a wheel having one or more free-form welded members, the wheel including:
    a front end and a back end;
    a central, axial spine member extending from the front end to the back end;
    an outer shell adjacent the spine member at the front end, extending toward the back end, and flaring radially away from the spine member near the back end;
    the outer shell having a front surface and a back surface, and further including one or more protrusions extending from the front surface;
    at least one void defined between the spine member and the back surface of the outer shell; and
    at least one reinforcing structure including axially aligned, concentric ribs about the spine member.

2. The component of claim 1, wherein the at least one reinforcing structure includes axially aligned ribs protruding radially from the spine member to the outer shell.

3. The component of claim 1, wherein the at least one reinforcing structure includes a lattice of ribs.

4. The component of claim 1, wherein the component is a compressor wheel for a forced induction device.

5. The component of claim 1, wherein the component is a turbine wheel for a forced induction device.

6. A power system component for a machine, comprising:
a wheel having one or more free-form welded members, the wheel including:
    a central, axial spine member having a front end and a back end;
    an outer shell having a first end and a second end, wherein the first end of the outer shell is disposed adjacent the front end of the spine member and the second end of the outer shell extends toward the back end of the spine member, the outer shell flaring radially away from the spine member near the second end of the outer shell;
    the outer shell having a front surface and a back surface, and further including one or more protrusions extending from the front surface;
    at least one void defined between the spine member and the back surface of the outer shell;
    at least one reinforcing structure connecting the outer shell with a portion of the spine member between the first end and the second end of the outer shell;
    wherein the at least one reinforcing structure includes one or more radially extending reinforcing discs.

7. A power system component for a machine, comprising:
a wheel having one or more free-form welded members, the wheel including:
    a front end and a back end;
    a central, axial spine member extending from the front end to the back end;
    an outer shell adjacent the spine member at the front end, extending toward the back end, and flaring radially away from the spine member near the back end;
    the outer shell having a front surface and a back surface, and further including one or more protrusions extending from the front surface;
    at least one void defined between the spine member and the back surface of the outer shell;
    at least one reinforcing structure connecting the outer shell with a portion of the spine member between the front end and the back end;
    a backing plate connecting the spine member to the outer shell at the back end; and
    a central bore through the spine member and at least one passage connecting the at least one void to the central bore.

8. The component of claim 7, further including at least one slot in the backing plate corresponding with the at least one void.

9. A method of manufacturing a power system wheel for a machine, comprising:
    melding metal powder in a controlled pattern to form a first layer of the wheel;
    melding one or more additional layers of the metal powder in a controlled pattern, each layer building upon the previous layer to form a central, axial spine having a front end and a back end;
    continuing to meld additional layers to form an outer shell having a first end and a second end, wherein the first end of the outer shell is disposed adjacent the front end of the spine member and the second end of the outer shell extends toward the back end of the spine member, the outer shell flaring radially away from the spine member near the second end of the outer shell, the outer shell having a first surface and a second surface, and further including one or more protrusions extending from the first surface and at least one void defined between the spine member and the second surface of the outer shell; and continuing to meld additional layers to form at least one reinforcing structure connecting the outer shell with a portion of the spine member between the first end of the outer shell and the second end of the outer shell, the reinforcing structure including at least one of:

axially aligned, concentric ribs about the spine member; and one or more radially extending reinforcing discs.

10. The method of claim 9, further including using free-from welding to form all portions of the wheel.

11. The method of claim 9, further including free-from welding a backing plate connecting the spine member to the outer shell at the second end of the outer shell.

12. The method of claim 9, further including attaching a backing plate to connect the spine member to the outer shell at the second end of the outer shell.

13. The method of claim 12, further including welding the backing plate in place separate from the free-form welding of the rest of the wheel.

14. The method of claim 9, further including removing un-melded powder from the at least one void.

15. A machine, comprising:
a frame;
an engine mounted on the frame;
a power system component associated with the engine and including a wheel having one or more free-form welded members, the wheel including:
 a central axial spine member having a front end and a back end;
 an outer shell having a first end and a second end, wherein the first end of the outer shell is disposed adjacent the front end of the spine member and the second end of the outer shell extends toward the back end of the spine member, the outer shell flaring radially away from the spine member near the second end of the outer shell;
 the outer shell having a front surface and a back surface, and further including one or more protrusions extending from the front surface;
 at least one void defined between the spine member and the back surface of the outer shell; and
 at least one reinforcing structure;
 wherein the reinforcing structure includes at least one of:
  axially aligned, concentric ribs about the spine member; and
  one or more radially extending reinforcing discs connecting the outer shell with a portion of the spine member between the first end and the second end of the outer shell.

16. The machine of claim 15, wherein the at least one reinforcing structure includes axially aligned ribs protruding radially from the spine member to the outer shell.

17. The machine of claim 15, wherein the at least one reinforcing structure includes a lattice of ribs.

18. The machine of claim 15, further including a central bore through the spine member and at least one passage connecting the at least one void to the central bore.

19. A method of manufacturing a power system wheel for a machine, comprising:
melding metal powder in a controlled pattern to form a first layer of the wheel;
melding one or more additional layers of the metal powder in a controlled pattern, each layer building upon the previous layer to form a central, axial spine member extending from a first end to a second end of the wheel;
continuing to meld additional layers to form an outer shell adjacent the spine member at the first end of the wheel, extending toward to the second end of the wheel, and flaring radially away from the spine member near the second end, the outer shell having a first surface and a second surface, and further including one or more protrusions extending from the first surface and at least one void defined between the spine member and the second surface of the outer shell:
continuing to meld additional layers to form at least one reinforcing structure connecting the outer shell with a portion of the spine member between the first end of the wheel and the second end, the reinforcing structure including at least one of:
 axially aligned, concentric ribs about the spine member; and
 one or more radially extending reinforcing discs connecting the outer shell with the spine member between the first end of the wheel and the second end; and
removing un-melded powder from the at least one void by removing the un-melded powder through at least one passage connecting the at least one void to a central bore through the spine member.

* * * * *